United States Patent
Sinchak et al.

(10) Patent No.: US 9,477,825 B1
(45) Date of Patent: Oct. 25, 2016

(54) SYSTEM FOR TRANSPARENT AUTHENTICATION ACROSS INSTALLED APPLICATIONS

(71) Applicant: TRUSTED MOBILE, LLC, Aurora, IL (US)

(72) Inventors: Jason Richard Sinchak, Aurora, IL (US); Troy Frost, Chicago, IL (US)

(73) Assignee: TRUSTED MOBILE, LLC, Aurora, IL (US)

( * ) Notice: Subject to any disclaimer, the term of this patent is extended or adjusted under 35 U.S.C. 154(b) by 0 days.

(21) Appl. No.: 15/091,382

(22) Filed: Apr. 5, 2016

Related U.S. Application Data

(60) Provisional application No. 62/190,884, filed on Jul. 10, 2015.

(51) Int. Cl.
*G06F 21/00* (2013.01)
*G06F 21/62* (2013.01)
*G06F 21/31* (2013.01)
(Continued)

(52) U.S. Cl.
CPC .......... *G06F 21/31* (2013.01); *G06F 21/6218* (2013.01); *H04L 9/0863* (2013.01); *H04L 63/08* (2013.01); *H04L 63/083* (2013.01); *H04L 63/10* (2013.01); *H04L 63/107* (2013.01); *H04W 12/06* (2013.01); *G06F 21/57* (2013.01); *G06F 2221/2107* (2013.01); *G06F 2221/2111* (2013.01)

(58) Field of Classification Search
CPC .......... G06F 2221/2111; G06F 21/31; G06F 21/6218; G06F 21/57; G06F 2221/2107; G06F 21/62; G06F 2221/0708; H04W 88/02; H04W 4/027; H04W 4/028; H04W 12/06; H04L 63/0428; H04L 63/107; H04L 63/10; H04L 9/3236; H04L 63/0492; H04L 63/0853; H04L 9/0863; H04L 63/083; H04L 63/08; H04L 9/088

See application file for complete search history.

(56) References Cited

U.S. PATENT DOCUMENTS 6,985,588 B1 * 1/2006 Glick .................. G06F 21/10
380/258
7,206,791 B2  4/2007 Hind et al.
(Continued)

OTHER PUBLICATIONS

Iachello, Giovanni, and Gregory D. Abowd. "A token-based access control mechanism for automated capture and access systems in ubiquitous computing." (2005).*
(Continued)

*Primary Examiner* — Michael Simitoski
(74) *Attorney, Agent, or Firm* — Michael R. Turner; Neal, Gerber & Eisenberg LLP

(57) ABSTRACT

A system for authenticating mobile device users transparently is disclosed. This invention improves on the existing flaws by deriving encryption keys from environmental condition data when the user and device are trusted. The keys are then cryptographically hashed and compared with repository hashed data to determine if the conditions match a prior set of conditions. If a match is found and trust factors are sufficient, the system uses the condition data to decrypt a master key that allows access to secure data in the same manner as would a user-provided password. The security system cannot be bypassed if the device is stolen, as an attacker would have to replicate the exact environment and behavioral attributes employed and learned from the user without any knowledge as to the factors that constitute them because the factors are not maintained by the system.

23 Claims, 6 Drawing Sheets

(51) Int. Cl.
*G06F 12/14* (2006.01)
*H04L 29/06* (2006.01)
*H04L 9/08* (2006.01)
*H04W 12/06* (2009.01)
*G06F 21/44* (2013.01)
*G06F 21/88* (2013.01)
*G06F 21/57* (2013.01)

(56) References Cited

U.S. PATENT DOCUMENTS

| | | | |
|---|---|---|---|
| 7,617,542 B2* | 11/2009 | Vataja | G06F 21/10 340/995.28 |
| 8,578,454 B2 | 11/2013 | Grim | |
| 8,621,583 B2 | 12/2013 | Yang et al. | |
| 8,627,077 B2 | 1/2014 | Herbach et al. | |
| 8,646,060 B1* | 2/2014 | Ben Ayed | H04L 63/0853 726/9 |
| 8,660,532 B2 | 2/2014 | Conti et al. | |
| 8,943,566 B2 | 1/2015 | DeLuca et al. | |
| 9,166,962 B2* | 10/2015 | Goldsmith | H04L 63/08 |
| 9,225,702 B2 | 12/2015 | Hallam-Baker | |
| 9,286,453 B2* | 3/2016 | Boss | H04L 63/20 |
| 9,319,402 B2* | 4/2016 | Os | H04L 63/0853 |
| 9,330,275 B1* | 5/2016 | Endresen | G06F 21/6218 |
| 2002/0177449 A1* | 11/2002 | McDonnell | G06F 21/00 455/456.1 |
| 2003/0105971 A1* | 6/2003 | Angelo | G06F 21/31 726/5 |
| 2003/0112182 A1* | 6/2003 | Bajikar | G06F 21/30 342/457 |
| 2005/0193144 A1* | 9/2005 | Hassan | G06F 21/31 709/238 |
| 2006/0059096 A1* | 3/2006 | Dublish | G06F 21/10 705/57 |
| 2006/0236369 A1* | 10/2006 | Covington | H04W 12/06 726/1 |
| 2008/0126805 A1* | 5/2008 | Owlett | H04L 9/3236 713/176 |
| 2008/0155649 A1* | 6/2008 | Maler | H04L 63/20 726/1 |
| 2008/0182592 A1* | 7/2008 | Cha | H04L 63/04 455/456.3 |
| 2009/0080658 A1* | 3/2009 | Waters | G06F 21/6218 380/277 |
| 2009/0110191 A1* | 4/2009 | Sanvido | H04L 9/0863 380/44 |
| 2009/0251282 A1* | 10/2009 | Fitzgerald | G06F 21/88 340/5.31 |
| 2009/0327888 A1 | 12/2009 | Woolf et al. | |
| 2010/0175116 A1* | 7/2010 | Gum | G06F 21/31 726/6 |
| 2010/0195829 A1* | 8/2010 | Blom | G01S 19/14 380/255 |
| 2010/0290617 A1* | 11/2010 | Nath | H04L 9/008 380/29 |
| 2011/0016534 A1* | 1/2011 | Jakobsson | G06F 21/316 726/28 |
| 2011/0098056 A1* | 4/2011 | Rhoads | G01C 21/20 455/456.1 |
| 2011/0283338 A1* | 11/2011 | Yang | H04L 9/321 726/4 |
| 2011/0314558 A1* | 12/2011 | Song | G06F 21/316 726/28 |
| 2012/0011559 A1* | 1/2012 | Miettinen | G06F 21/31 726/1 |
| 2012/0060008 A1* | 3/2012 | Matsushima | G06F 21/62 711/163 |
| 2012/0260094 A1* | 10/2012 | Asim | G06F 21/10 713/171 |
| 2013/0290707 A1* | 10/2013 | Sinclair | H04L 9/0891 713/161 |
| 2013/0347058 A1* | 12/2013 | Smith | G06F 21/57 726/1 |
| 2014/0157390 A1 | 6/2014 | Lurey et al. | |
| 2014/0189784 A1* | 7/2014 | Marino | G06F 21/60 726/1 |
| 2015/0067116 A1 | 3/2015 | Lyman et al. | |
| 2015/0141005 A1* | 5/2015 | Suryavanshi | H04L 67/125 455/434 |
| 2015/0169891 A1* | 6/2015 | Hook | G06Q 30/0257 726/29 |
| 2015/0237092 A1* | 8/2015 | Liao | H04L 43/08 709/224 |
| 2015/0318994 A1* | 11/2015 | Walsh | H04L 9/3236 713/182 |
| 2015/0371026 A1 | 12/2015 | Gnanasekaran | |
| 2016/0014095 A1* | 1/2016 | Strayer | H04L 63/0428 713/168 |
| 2016/0173501 A1* | 6/2016 | Brown | H04L 63/102 726/4 |

OTHER PUBLICATIONS

Clarke, Nathan, et al., Flexible and Transparent User Authentication for Mobile Devices, info@cisnr.org.

* cited by examiner

SYSTEM FOR TRANSPARENT AUTHENTICATION ACROSS INSTALLED APPLICATIONS

CROSS-REFERENCE TO RELATED APPLICATIONS

This non-provisional patent application claims priority to U.S. Provisional Patent App. No. 62/190,884 filed on Jul. 10, 2015.

TECHNICAL FIELD

This invention relates generally to computer security systems, and more specifically, for software systems or routines that enable or perform user authentication services, such as to authorize access to secure data. The invention particularly focuses on a secure means to perform transparent user authentication, such that user intervention or input is not required in trusted scenarios

BACKGROUND OF THE INVENTION

Many software applications require users to positively identify themselves before allowing access to private information. This could be so simple as logging on to a computer as a specific user, or providing credentials prior to accessing banking or other financial information. With the increase of information available over the internet or in a computerized form there has been a dramatic increase in identity theft, and theft of private or secured data to either use or offer for ransom by unauthenticated parties. To combat this trend, computer security systems have struggled to keep up, often requiring more extensive authentication protocols prior to allowing access to secure data. There may be multiple password challenges, the requirement to frequently change passwords, and a complexity level for passwords requiring numerous symbols, numbers, or capitalized letters, forming a lengthy string.

This trend toward complex, lengthy and robust authentication is juxtaposed against the market trending toward simplicity in the mobile workspace. Highly functional mobile devices that can access secure data (either on-device or remote) are ubiquitous, and the purpose behind such devices is immediate availability of information. They are purposefully small in size to allow for ease of mobility and placement in a purse or pocket. Users want instant access with a couple of touches to a touch screen or a swipe of a finger. They are easily frustrated with any requirement to input complex, lengthy passwords.

Organizations that have ported applications to the mobile space have attempted to impose ever more complex authentication mechanisms on mobile devices. However, complex passwords do not work well in the mobile workspace. Mobile application use is meant to be short and easy. Conventional passwords are incompatible on mobile devices due to form factor and ease-of-use requirements. These passwords can easily be mistyped working on a mobile device causing authentication errors and elongating the authentication process. Also, complex passwords often require a user to switch between multiple keyboards (letters, numbers, symbols). Users generally choose passwords that are simple and fast to enter on mobile keyboards, which results in very insecure passwords that are easily predicted by simple tools used by hackers.

While user-based authentication (e.g., provision of a password or proper response to a question, etc.) is limited and frustrating on mobile devices, there are ways to authenticate a user device without any direct input from the user. This "transparent authentication" is possible because of the numerous data gathering features of common mobile devices. As explained more fully below, these sensors detect a wide variety of data such as available wireless connections, the location of the device, the time of day, even the orientation of the device in a user's hand. Such "conditions," which may be environmental or behavioral or both, are often repeated, such that user authentication can be performed based on the regularity of the environmental conditions at a given time.

Other inventions have suggested using this condition data of a mobile device to help reduce inputs and simplify a user's experience. For example, US Pub. 2009/0327888 suggests using certain condition data picked up through device sensors to predict what a user will want to enter into certain fields of a form, such as the user's address or other information. US Pub. 2014/0157390 uses similar information, including the device's GPS location, to bring forward files or information the user is likely to want in that location, such as financial information when the user enters his bank, etc. US 2015/0371026 discloses a system that authenticates a user based on sensors picking up a connection to certain commonly accessed Bluetooth devices. In this case, the device connected via Bluetooth may function to transfer secure and unsecure data in order to assist with the authentication. U.S. Pat. No. 8,621,583 suggests sensor-based authentication by transmitting condition data off device to a secure password repository on a remote device. This remote device (secure password repository) analyzes the data and brokers the authentication (in a client-server fashion) by releasing the user's password to the authentication destination (e.g., a website) if the conditions are accepted. However, systems such as these require the user's sensitive data to be stored off-device, often in unencrypted fashion, and ultimately subject the data to capture by transferring it between devices.

Client-server systems rely on a distributed architecture because they were designed to authenticate to remote systems and therefore the system is subject to a multitude of vulnerabilities related to client-server communications. While these systems focus on using environmental conditions detected by mobile device to automate and simplify processes, none of them do so in a secure manner to perform transparent authentication, and they generally require sensitive raw data be stored, transmitted, and analyzed on a remote destination in an unsecure fashion to complete the authentication process successfully. When the authenticating conditions are retrievable on a remote component of a system, the system can be operated by an unauthorized party that gains control of the remote destination or control of the mobile device itself. Prior art client-server authentication systems are flawed in that they do not securely authenticate the user of the device to the device itself prior to attempting to use the device to authenticate to remote destinations. An unauthorized party can also masquerade as the originating device, without having the device at all, in an attempt to brute force the conditions that are required for the remote password repository to release the credentials. The remote repository may succumb to attacks from the local area network or Internet.

Typically, remote server based authentication systems are designed with the goal of leveraging a mobile device to authenticate to additional services outside of that device. Such systems do not aim to improve the authentication experience on the mobile device itself which is a core issue plaguing mobile devices. A key first step is to authenticate the user to the device itself, and that step is often ignored completely.

Environmental and behavioral data can afford authentication stronger than any password and boost usability of the device by not soliciting the user. However, these prior art systems are, at best, insecure solutions to the authentication problem. They determine if a profile matches based on raw data points and do not create any form of encryption keys from the environmental or behavioral data. They use only a single or a small number of conditional factors, which creates weak authentication that is possible to be spoofed or duplicated by unauthorized third parties. They do not ensure the security of the underlying device prior to performing authentication, and therefore allow the authentication system to be subverted in the event of a device compromise resulting in the capture of sensitive authenticating information. What is needed is a system for transparent authentication on mobile devices that is fully secure and provides both a pleasant and seamless user experience while aggressively protecting against password capture or unauthorized access in the event that a mobile device is misplaced or captured.

SUMMARY OF THE INVENTION

The present invention improves on the existing flaws by deriving actual encryption keys when the user and device are trusted. Thresholds are exposed to data owners that reflect risk appetite and the amount of trust required prior to allowing transparent authentication. This ensures the process is not easily manipulated by third parties and balances security with usability. Mobile devices using this invention cannot be accessed if stolen, as an attacker must replicate the exact environment and behavioral attributes employed and learned from the user without any knowledge as to the factors that constitute them.

In a particular embodiment, a method of transparent user authentication is disclosed that involves receiving a request for a master key to access secure data, gathering present conditions from a plurality of device sensors, and, using a processor and an encoding algorithm, cryptographically hashing each present condition and comparing the resulting present hashes to pre-recorded hashes representing past conditions, the pre-recorded hashes stored in a profile repository in a memory of a user computerized device, in order to generate a trust score. If the trust score exceeds a predetermined threshold, the invention then generates a candidate token by cryptographically hashing a data string formed by the present conditions and comparing it to pre-recorded tokens stored in the token repository of the memory. If the candidate token matches a matched token among the pre-recorded tokens, the invention then uses a derived key generated from the present conditions to decrypt an encrypted copy of the master key uniquely associated with the matched token. It then provides the master key to access the secure data. In a preferred embodiment, once the data is gathered by the sensors, the entire authentication process can be performed without the transmission of data external to the user computerized device. This prevents possible data theft during transmission, or from the receiving computer device.

In a particular embodiment, a system for providing access to secure data is disclosed that involves a computerized user device equipped with a memory, a processor, an input mechanism, an output mechanism, and one or more sensors to gather user environmental data. The memory houses a first application configured to send a user authentication request prior to allowing an unauthenticated user access to data secured within the application (secured data is encrypted within the first application using entropy provide by the user, such as a user's password in conventional authentication methods) and a second application (e.g., a library of computer code) integrated with the first application to receive the user authentication request, quickly perform analysis, and respond to the request by generating a master key for use by the first application to access the secure data. The memory also includes a token repository for storing tokens generated by the second application, each token representative of a particular set of user environmental and behavioral conditions collected at a previous time by the one or more sensors. In this case, upon receiving a user authentication request, the second application is configured to generate a candidate token using the trusted present conditions measured by the one or more sensors and, if the candidate token matches a matched token present in the token repository, the second application generates the master key from an encrypted key stored in the token repository and uniquely associated with the matched token. This key is then provided to the first application and used to securely decrypt the protected data without requiring user interaction.

In a particular embodiment, a system for authenticating a user wishing to access secure data through a protected software application is disclosed that involves a computing device comprising a processor, a memory, an input mechanism and an output mechanism. A plurality of sensors associated with the computer device are used to detect one or more conditions, and a token repository within the memory stores a plurality of tokens, each token representative of a unique combination of conditions. A protected application stored within the memory is executable to provide secure data to the output mechanism upon user authentication. An authentication application stored within the memory is integrated with the protected application, the authentication application configured to authenticate the user to the protected application without user input when present conditions detected by the plurality of sensors match the conditions represented by a matched token from among the plurality of tokens within the token repository.

BRIEF DESCRIPTION OF THE DRAWINGS

The present invention can be better understood with reference to the following figures. The components in the figures are not necessarily to scale, emphasis instead being placed upon clearly illustrating the principles of the present invention. In the figures, like reference numerals designate corresponding parts throughout the several views.

DETAILED DESCRIPTION

Figure 1:
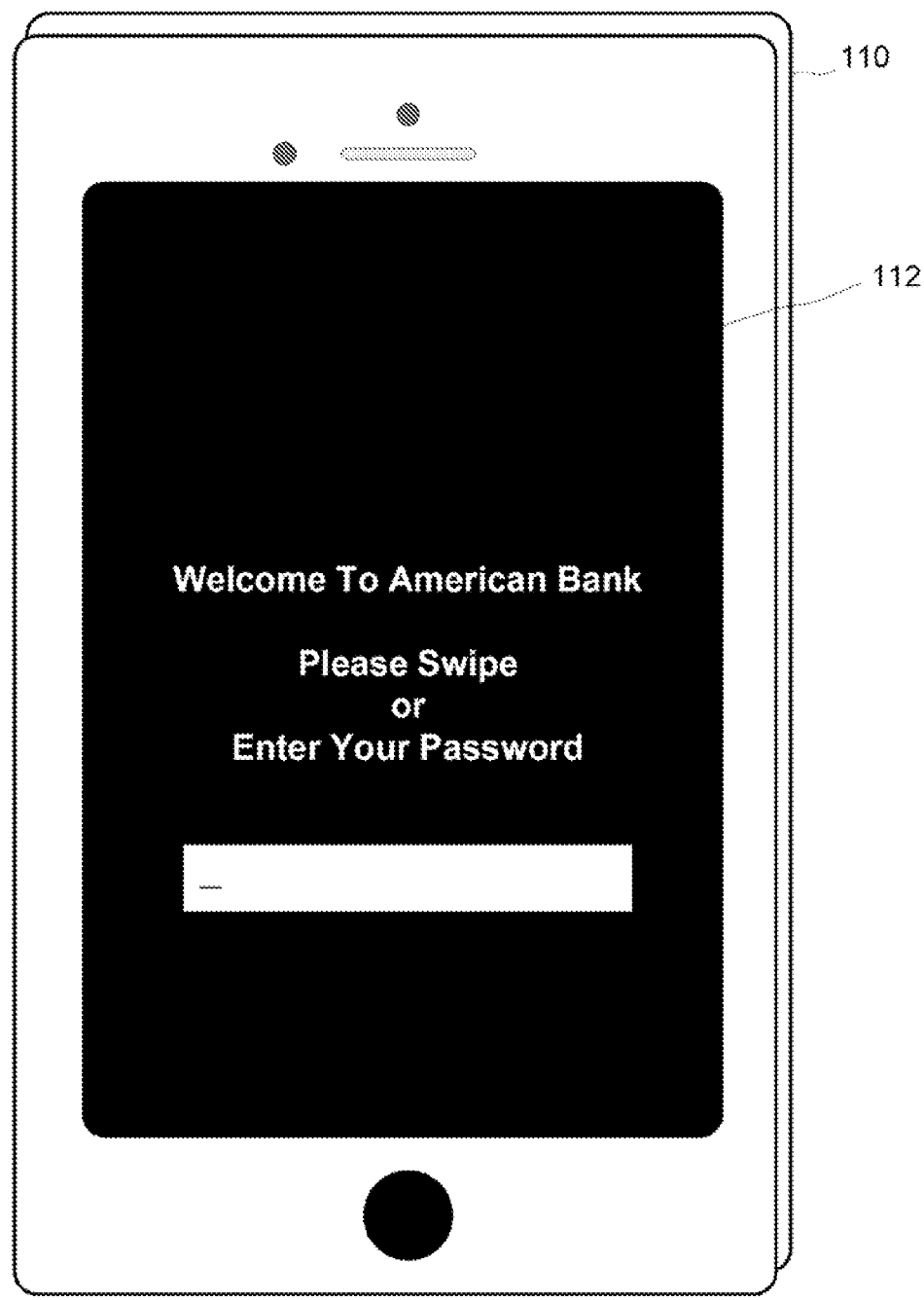
FIG. 1 is an exemplary computerized user device that may be used to operate the system and execute the methods of the invention.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Transparent authentication uses different environmental and behavioral artifacts to augment conventional password use. A process of measuring trust enables transparent authentication by measuring both the device and user security. If the device is deemed secure and the user is deemed trustworthy (low risk) then environment and behavioral factors can be employed as a replacement for password use to derive encryption keys that ultimately authenticate the user. In the event the preliminary trust measurement indicates that the user is untrusted, they may be prompted for a conventional form of authentication. Prompting for and successfully authenticating through a conventional form, such as a password, informs the transparent authentication mechanism to trust the previously untrusted environmental and behavioral data points available. A process of learning and thresholds are employed to learn only trusted conditions and leverage data points in those conditions to securely and transparently authenticate a user to a mobile application.

The first time a user will access an application the authentication process will be normal and straightforward. They execute the application, a password prompt is presented to the user, the user types in their password, and they are authenticated. In the background, the invention processes data points and establishes a baseline during each successful authentication. Future authentication attempts continue to strengthen the baseline until the user becomes trusted in common situations. Once the user is trusted in a particular authentication situation they will no longer have to enter a password and the application will automatically generate the master key required for authentication. In the event the user attempts to authenticate in an environment or behavior that is abnormal they will be prompted through conventional means to authenticate to the application.

The present invention involves a mobile application on a device possessing a series of environment and behavioral sensors (GPS, gyroscope, compass, time, Bluetooth, wife, etc). A core detection engine is used to compute reliable user and system trust scores. A secure data store houses hashed data points and candidate transparent authentication hashes with encrypted copies of a master key. The system involves user and system trust score computation, storing candidate hashes, generating tokens representative of conditions, and a mechanism to derive encryption keys from data points. The system can learn new conditions for transparent authentication after a specific frequency has been met.

A secure method of managing sensitive data is required to ensure the privacy and security of the user. All measured conditions are protected by creating a cryptographic hash employed in a baseline analysis fashion to determine known and unknown (trusted or untrusted) conditions. The hashed conditions form baseline measurements of historical data points. Irreversible hashing retains the uniqueness of the data point and allows comparisons to be performed without revealing the meaning of the data. In the event hashed data is leaked or available to an attacker, the attacker must first brute force the data. In most cases the underlying data is complex and would require extensive resources to disclose.

A derived encryption key is produced from a hash of concatenated present condition data defining a variety of trusted environmental and behavior conditions. This derived encryption key can be used to decrypt a copy of the same master key that the password is capable of decrypting. Therefore a useable copy of the master key needed to access the desired secured data can be obtained using either the password or the derived key. However, that derived key can only be produced if present conditions match a trusted state during which password authentication has successfully been performed in the past. The system determines this not by comparing the actual conditions, but by comparing irreversible hashes of them (or of data related to them). The system allows the transparent authentication process to operate without added input or interaction during trusted conditions and provide a seamless "transparent" authentication.

In a preferred embodiment, the invention operates 100% local to the mobile device. All data and analysis is done on the user's device to prevent data from being captured during transmission or at remote repositories. Ideally, transparent authentication is only performed on-demand when passwords are requested (authentication is sought). This ensures that no analysis is performed when the device is used for other applications that do not involve secure transactions.

Trust measurement foremost identifies the security of the device prior to enabling any form of authentication, transparent or conventional. The security of the device is paramount to preventing credential theft or decryption of sensitive data on a compromised device. The invention both serves to secure the device and enable advanced usability once trust is established. The inherent security of the device is measured prior to enabling any form of authentication, transparent or conventional (e.g., user-password driven).

A review of the figures will illustrate the operation of both a conventional system and show how an exemplary embodiment of the present invention may seamlessly integrate with a conventional system to avoid unnecessary user steps. In the illustrated exemplary embodiment, certain terms are used that should not be read in a manner to limit the invention. First, as one of ordinary skill in the computer software arts would recognize, the term "application" is non-limiting. The example refers to a "Protected Application" and an "Authentication Application". Though used separately herein, the "protected application" and the "authentication application" could be components of a single, executable software application. Both represent routines, or lines of executable software code that perform specific functions when called. The term "application" should not be interpreted to indicate that the Protected Application and the Authentication Application must be separate, stand-alone executable programs. While that may be the case, they may be fully integrated so as to operate seamlessly to the user in a manner where the user never calls on or executes the Authentication Application. Rather, it simply executes when called as an embedded routine within the Protected Application.

One of ordinary skill in the relevant art will also appreciate the distinction between hashing (tokenization) and encryption. For purposes herein, something encrypted may be unencrypted or decrypted using a key. Hence, encryption is synonymous with a locked door. What is locked and secured may be obtained again, but only using the key to the door. Contrarily hashing, at least as used herein, is considered a one-way, irreversible step. When data is hashed, is submitted to a routine that transforms it into an unrecognizable state. Though it is a representation of the data used to create it, the hashed result cannot be used to once again derive that data. However, the transformation routine is consistent. A precise input, will produce the same precise output each time. Furthermore, that precise output will be unique from all other outputs produced from different inputs. Thus, the hashed results of two inputs can be compared to determine if the two inputs were the same. If the two hashed outputs are distinct, it is certain that the two inputs were also distinct, without ever knowing or determining what the inputs were. It is on this foundation that the present invention operates to perform transparent authentication in a secure manner, and different than prior art systems that reveal or store conditional data.

FIG. 1 illustrates an exemplary mobile device 110 that a user might use to access a secure application. In this instance, the screen of the mobile device (input/output mechanism 112 of a common touch screen) is displaying the sign-in page to an exemplary protected application. Though a banking application is used as an example, a protected application could be any executable program that requires user authentication in order to access certain data or functionality. Here, the protected application is performing the ubiquitous prior art step of conventional user authentication, where a password is being solicited from the user. While necessary to initiate use of the invention, this is the very step the invention ultimately seeks to alleviate or reduce.

Figure 2:
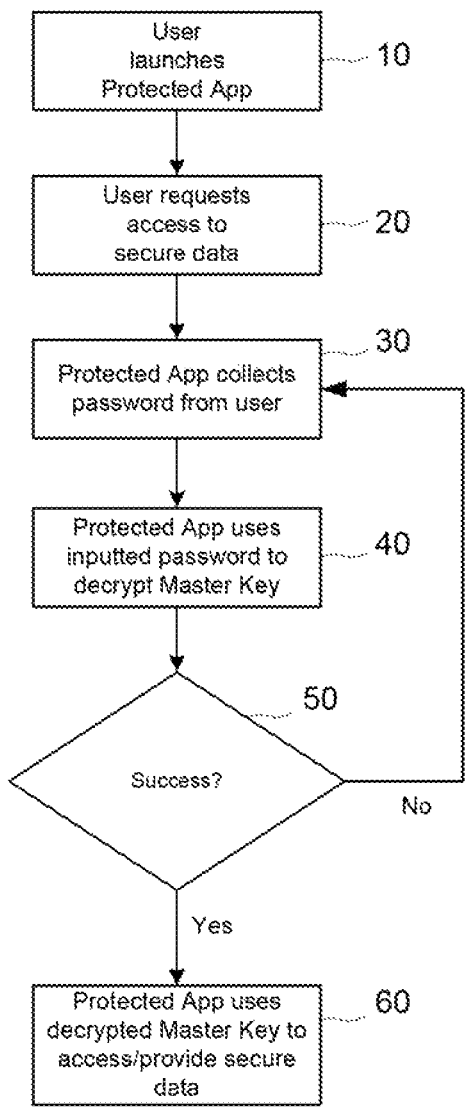
FIG. 2 is a flow chart showing steps associated with a prior art method of user authentication

FIG. 2 provides a flow chart showing the steps associated with the prior art authentication process illustrated in FIG. 1. As illustrated, the process begins at step 10 when the user launches a Protected Application. Either at launch, or at some point during the session with the application, the user then reaches a point where access to secure data is requested (step 20) and user authentication is required. In the prior art (and at least initially, when using the present invention), a password is collected from the user (step 30). The password is merely a data string, which may be complex or simple, that was previously provided to the application, and is known to the user. The protected application may have the password stored, but it need not do so. When originally provided, the protected application would use the password to encrypt a master key that is used to access the secure data. The version of the master key encrypted with the user's password is saved in association with the user's account (e.g., identified by the username), and it can only be decrypted when the same password is provided. The protected application uses the provided password to attempt decryption of the master key stored with the user's account at step 40. If the password is correct, the master key will be decrypted and used to access the secure data (step 60). If not, the protected application ("app") will typically identify that the password is incorrect, and seek a new one (back to step 30). After a few wrong attempts, the app will typically exit the routine and authentication will have failed. The present invention begins with this same common routine, but "learns" from a successful authentication, as discussed below.

Figure 3:
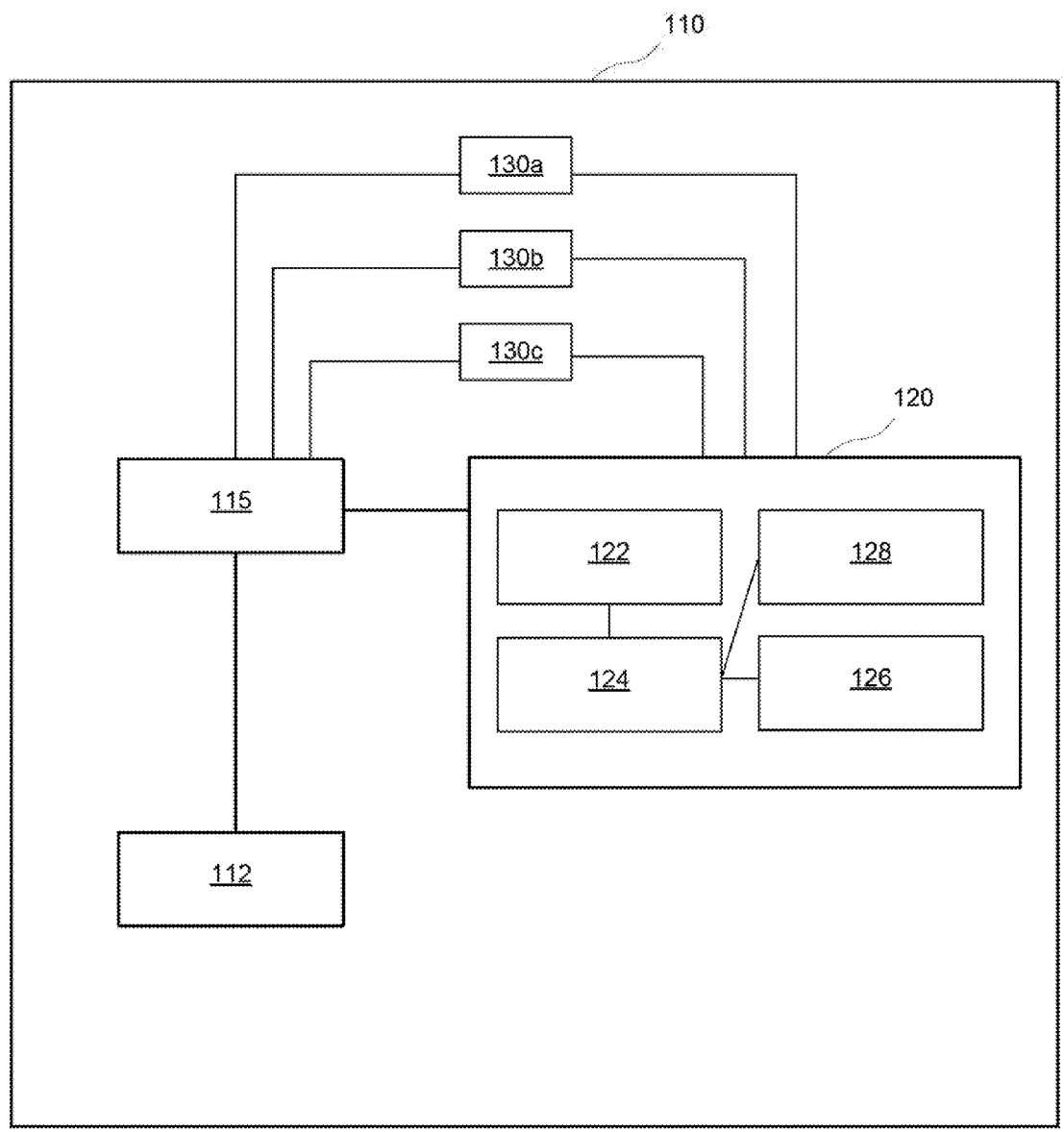
FIG. 3 is a block diagram of components of an exemplary computerized user device that would be employed through operation of the invention.

FIG. 3 illustrates certain components of mobile device 110 in the exemplary embodiment. While the example uses a mobile device, and a mobile environment is the most beneficial use of the invention, a standard desktop or any other computer device running an application with the illustrated components could be substituted. As shown, mobile device 110 is equipped with a processor 115 connected to a memory 120, an input/output mechanism 112, and a collection of sensors 130. The sensors used by the invention can be of a wide variety, but are not unique to the invention. Rather, the invention utilizes pre-existing sensors commonly found on a mobile device such as, for instance: a global positioning system sensor; a wireless network or Bluetooth sensor/detector; a motion sensor; gyroscopic sensors for measuring device grip (angle, pitch, roll) or device orientation (vertical vs. horizontal, face up vs. face down); charging or power sensors; a temperature sensor; a clock or time sensor; signal strength detectors; lighting sensors; etc. As seen, the term "sensor" is broadly used to encompass any data gathering/data reporting utility that can be accessed by the authentication application 124 within memory 120 to feed information to the processor 115. Each sensor reports a "condition" used to define the user's behaviors and environment at a particular point in time—namely, the time at which the user is being authenticated.

Within memory 120 are a number of application programs, including at least the protected application 122 that is requesting authentication and authentication application 124 that is assisting with or performing the authentication. The authentication application 124 is in communication with token repository 126 and profile repository 128. These repositories are synonymous with a database or other memory storage, and can be combined or maintained separately. As discussed more fully below, the token repository stores tokens, which are, as defined herein, irreversible cryptographic hashes of data representing environmental and behavioral conditions read by the sensors at a given time. Each token is stored along with an associated encrypted version of the master key. The profile repository stores irreversible cryptographic hashes of direct, raw condition information. Though the hashed information in the profile repository cannot be used to glean any information about the user, it can be used (along with the same hashing algorithm) to determine whether a particular condition is commonplace for the user or not, as described below.

With the exemplary authentication app integrated with the protected app, the transparent authentication system will begin to build up the token repository as the user performs conventional password-driven authentication. That is, when authentication via password is successful, and other system conditions are met, the environmental and behavioral conditions at that time are trusted (the conditions may be referred to as "trust factors") and a token may be recorded to memorialize them for later comparison. This is illustrated in FIG. 4.

Figure 4:
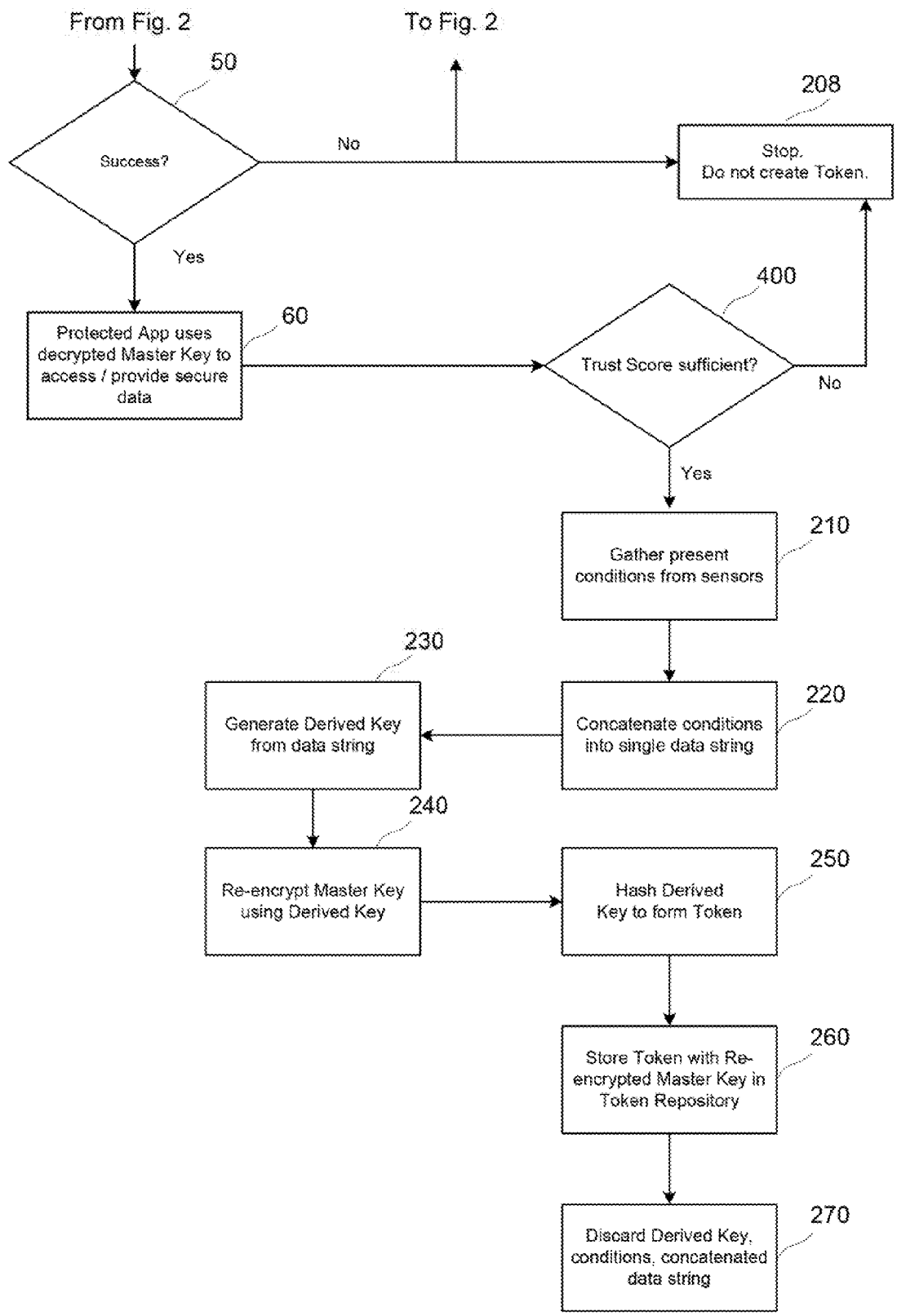
FIG. 4 is a flow chart showing steps that may be taken in accordance with the invention when user authentication is requested in a trusted scenario.

FIG. 4 flow initiates with the success determination of the conventional password authentication of FIG. 2. If the password fails and the conventional system loops, the authentication app makes no attempt to create a token (step 208). In fact, in some embodiments, even though the password may be properly entered on a next pass, a single failure of password entry will cause a condition of uncertainty that would prohibit token generation. However, if the conventional authentication succeeds (step 60), the authentication app will perform a secondary check to measure the trust score at step 400. As discussed below, this decision step involves a number of sub-steps, which are broken out and discussed in relation to FIG. 6. The trust score is an overall indication of whether present conditions are safe and "normal" enough to allow for token creation. If tokens are created in unsafe conditions, the system could be compromised in various ways, or the system could function to authorize access at a later time to the wrong user, etc. If the trust score is not sufficient, a token will not be created and the routine will stop (step 208). What constitutes "sufficient" may be a user-controlled metric. The lower the trust score threshold, the more frequent the system will be able to conduct transparent authentication. However, a lower trust score threshold will also lower the integrity of that authentication, and increase the risk of tampering or a false positive.

Assuming the password is correct and the trust score is sufficient, the authentication app gathers present conditions from sensors at step 210. Some sensors may not be available at the present time, and may report no data. For example, the device may be in "airplane mode" or have certain sharing capabilities disabled. This will result in a weaker token, if one can even be created. The more data available from the sensors, the more precise and complex the token will be. The condition data is then concatenated into a single data string (step 220) and hashed with a device specific identifier to generate a derived key (step 230). Importantly, the derived key cannot be revered to determine the present conditions. However, using the same hashing algorithm will always produce the same hashed result from a given set of conditions.

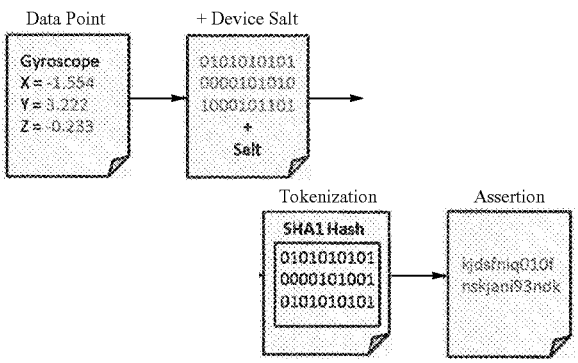

Though the particular hashing algorithm used is not critical so long as it is sufficiently robust, the above path provides an example of taking a condition data point (here, device orientation data from a gyroscope) and transforming it into a hashed result. The binary equivalent of the data is crossed with device specific information (salt) and submitted to SHA-1 ("secure hash algorithm 1") to produce a new, hash value data string (a message digest) bearing no resemblance to the initial condition. This initial result of hashing the concatenated data string of present conditions is referred to herein as the derived key.

Because the password was successful, the system now has the master key, which was decrypted using the proper password. This master key is then re-encrypted not using the password, but rather using the derived key that is a reflection of the present conditions (step 240). The encrypted key that results can then be decrypted into the master key using that derived key. Accordingly, it would not be secure to save or retain the derived key. Rather, the derived key is then submitted to the hashing algorithm again (in practice, it may be submitted several or even one hundred more times) to produce a token at step 250. The token, while representative of the derived key, cannot be used to generate the derived key because of the irreversible hashing. Accordingly, the token may safely be retained in the token repository (step 260). Stored with the token, and in a fashion such that the two are uniquely paired, is the encrypted key that was created using the derived key. While it can still be unlocked, all manner of doing so is discarded by the system for security purposes at step 270. This includes the derived key, the present conditions that they represent, the concatenated data string formed by the conditions, and the password supplied by the user.

On this first pass, the system has not been able to perform transparent authentication. As discussed below, this is only possible on subsequent passes when tokens can be matched. In practice, and depending on the trust score settings, it may take many password entries at repetitive times to be able to reach a point where secure transparent authentication is possible using the invention. However, once successful in a given set of conditions, it will become more commonplace and password entry will become ever less frequent.

Figure 5:
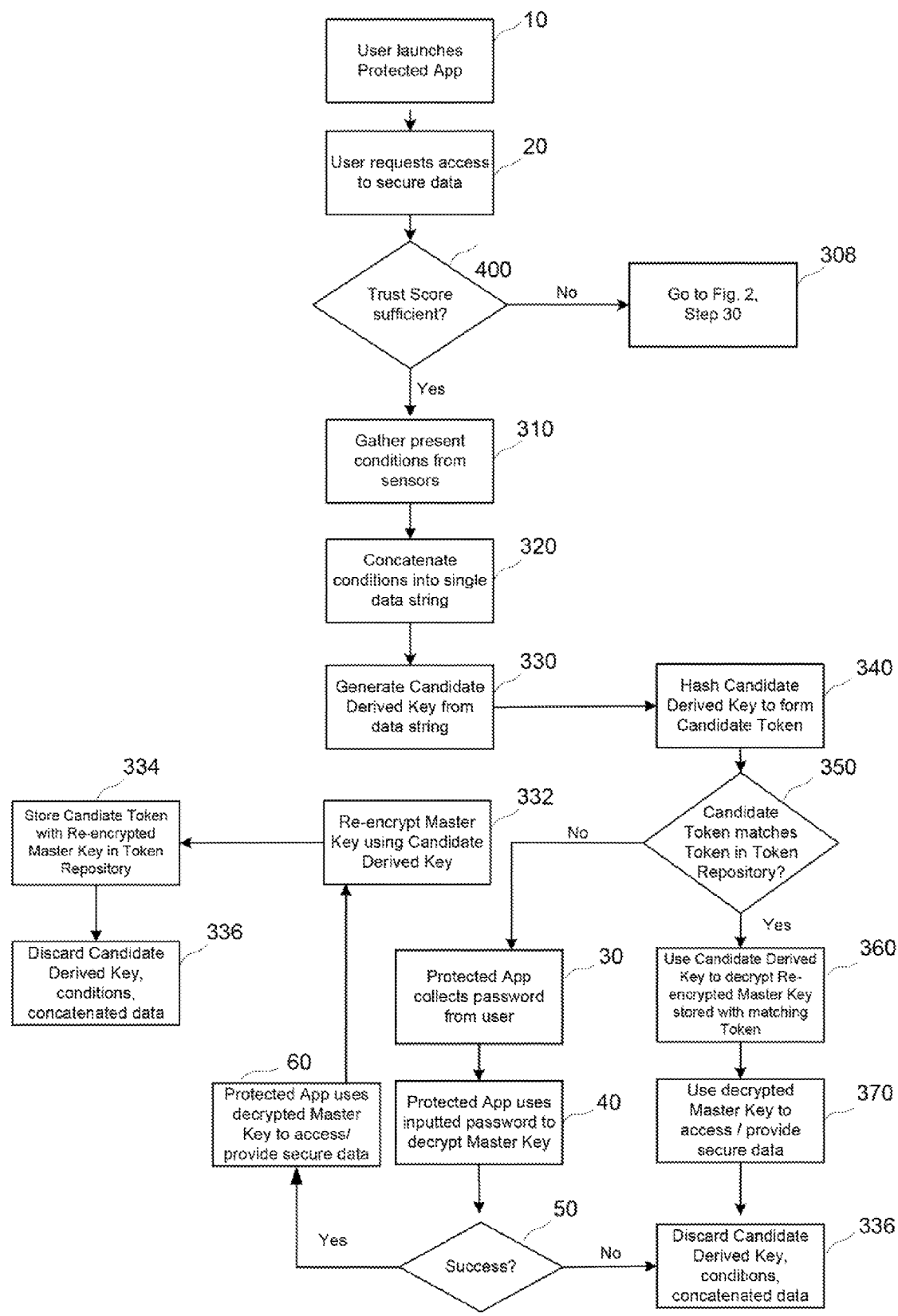
FIG. 5 is a flow chart showing steps that may be taken in accordance with the invention when user authentication is requested in a trusted scenario that has been previously experienced by the system, resulting in transparent authentication.

FIG. 5 illustrates the flow of such a subsequent pass (which may be the next pass, but more likely is many passes later) where transparent authentication is attempted and succeeds. The path starts much the same as that of FIGS. 2 and 4, with an authentication request. Again, an analysis of the trust score at the present time is performed to see if a token should even be created (step 400). Assuming so, present conditions are gathered (if not already done as part of the trust score evaluation—see below), and again concatenated into a data string (step 320) that is then hashed into a derived key (step 330). For clarity, this derived key on the subsequent pass is referred to herein as the candidate derived key.

Note that this is all performed prior to step 30 of FIG. 2. In other words, these steps are running in the background and the protected app has not yet requested a password from the user. The candidate derived key is then held by the system, but a copy of it is hashed at step 340 to create a token just like in the FIG. 3 prior pass. For clarity, this token on the subsequent pass may be called the candidate token. The authentication app then checks in the token repository for a match to the candidate token. If a matched token is found in the token repository, then the candidate derived key should be the same as the derived key that was used to generate the matched token. Accordingly, it will also be the same as the derived key that was used to create the encrypted key stored in association with that matched token.

At step 360, the encrypted key is, thus, decrypted using the candidate derived key created on the subsequent pass and not yet discarded by the system, thereby generating the master key which can be used to transparently authenticate the user and access the secure data at step 370. To complete the process and ensure security, the system discards the candidate derived key, the conditions it represents, and any other data related to them (step 336).

Backing up, should no matching token be located for the candidate token in the token repository (step 350), the system must revert to the conventional mechanism of password collection (step 30) for user authentication. If the password fails, the transparent authentication process stops and all condition information is discarded (step 336). If the password succeeds, the master key is decrypted and used (step 60), but it is also passed to step 332 where it is re-encrypted using the still-retained candidate derived key, and flow simulates that of FIG. 4. In other words, since no match was found for those conditions but they are nevertheless trustworthy, the candidate token is stored in the token repository in association with the new encrypted key (step 334). Finally, all non-secure condition data, and the candidate derived key that can unlock the new encrypted key are discarded (step 336).

Figure 6:
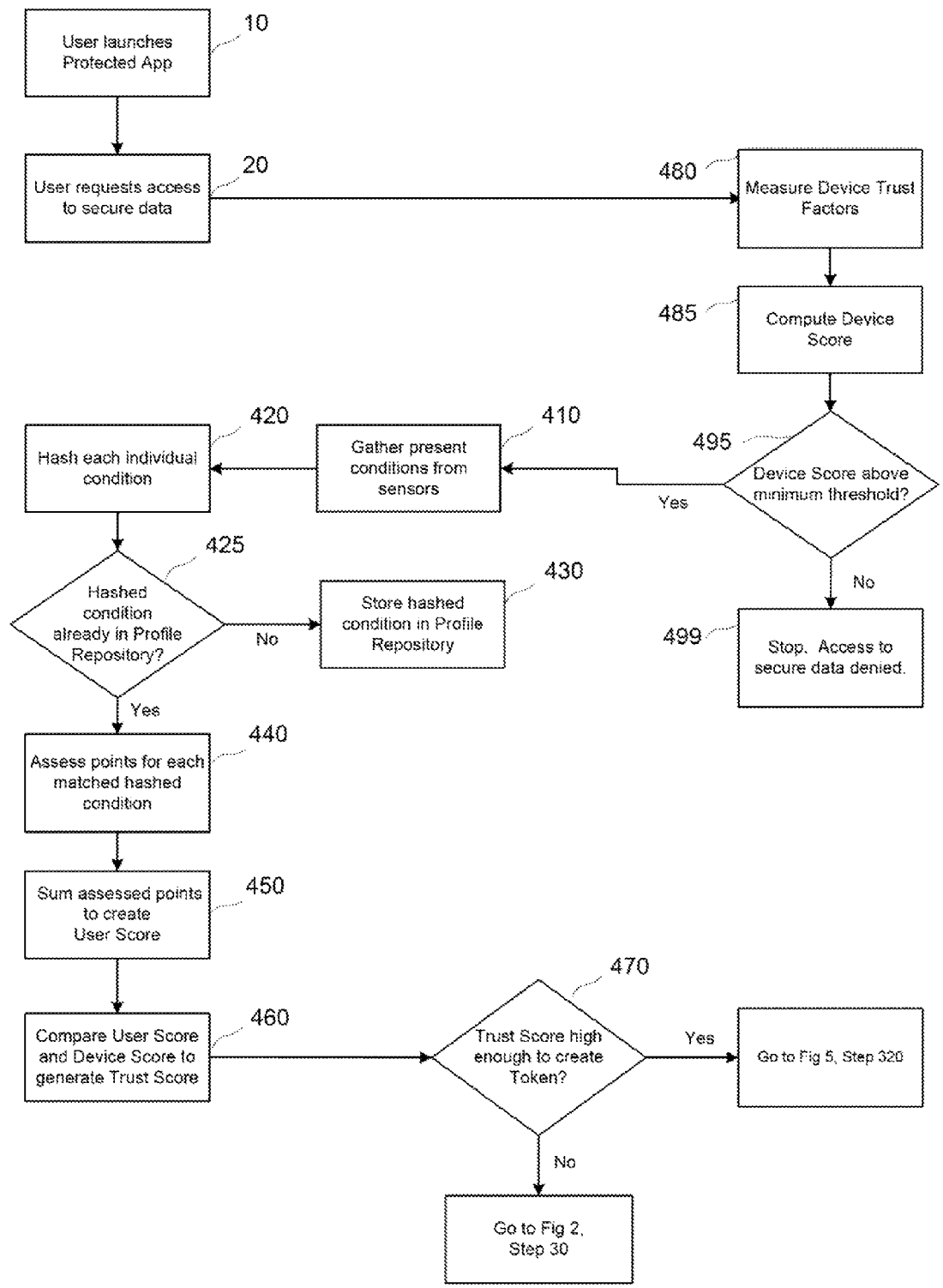
FIG. 6 is a flow chart showing steps that may be taken in accordance with the invention when user authentication is requested to determine if a trusted scenario exists.

Turning to FIG. 6, an expansion of the decision step 400 of FIGS. 4 and 5 is provided. This process is referred to as core detection, and results in the determination of a trust score. The trust score is a combined indication of both a user score, which assesses the normalcy or routineness of the behavioral and environmental conditions surrounding the present use, and the device score, which assess various system characteristics that may be indicative of a security threat. It is this trust score that is used to determine whether it is safe to generate a token or attempt transparent authentication.

Once again, the process initiates only upon an authentication request (step 20). This is a benefit because, unlike other systems, the invention need not be constantly monitoring conditions or tying up other device resources. The entire pathway of steps discussed in these figures can be performed by a standard mobile device processor in a fraction of a second, because it only occurs when necessary (when called by a user authentication request). This also allows better integrity of the tokens and stored profile information (discussed below). Ideally, user authentication most frequently occurs at standard times, locations, orientations—for example, when the user is standing on the train platform waiting to go to work in the morning, etc. It does not happen when the device is face down on the counter, or when traveling in the users pocket at some random location on a walk. Only capturing data upon authentication attempts prevents the token and profile repositories from being filled with data that could give a less robust indication.

Once authentication is requested, the authentication app measures, gathers, or assess device trust factors. These are different than environmental or behavioral conditions, and are rather aspects that convey inherent security of the device. For example, any of the following issues could suggest a low integrity leading to a low device score: operating system policy violation or missing patches; large outbound data flows; jailbreak detection; malicious file system artifacts; connection to an unsecure router; tethering to unsecured devices; binary modification; an altered root process; or unexpected file size changes. Factors such as these contribute to drive the device score down, which is computed by the authentication app at step 485. If the device score is below some minimum threshold, which may be set by the user or by the system manager, authentication will stop completely (step 499). In this case, even the conventional password entry will not be performed. Rather, some other agreed upon step must be taken to improve device security before access to secure data will be granted.

Assuming the device score exceeds the threshold, flow continues to step 410 where information to create a user score is calculated. The user score is a reflection of how common the various then-present conditions are. But because the system purposefully avoids storing conditions, they are compared in a hashed form so the underlying conditions are not retained or retrievable. Once the present conditions are gathered (410), they are irreversibly hashed (420) and checked against previously hashed conditions stored in the profile repository (step 425). Unlike with creation of the derived key, there is no concatenation step in this instance. Each individual condition is separately hashed. So long as the same hashing technique is used, a given condition (for example, a brightness measurement of 6) will always produce the same hashed data point. Though that data point is not reversible, it can be compared to other data points to determine a match. Where a match is found, that data point can be incremented within the profile repository, and the number associated with its occurrence can be used as a reflection in the user score. For example, if the brightness has been 6 during 430 of the last 500 authentication attempts, that fact would weigh more heavily toward a high user score than if it had been 6 only a dozen times.

By performing the hashing sequentially on the individual conditions and comparing to what is in the profile repository, the system can thus determine which conditions were present in past authentication attempts, and how frequently. FIG. 6 shows a simplified version where the hashed condition is either present or absent. If absent, the new condition is stored (step 430) and if present, points are assessed for a matched hashed condition (step 440). Not all conditions need be weighted equally. For example, a condition relaying physical location that is matched may be assessed more points than a match for grip position (which may be common among some users). Again, instead of just "present" or "absent," the number of times the condition has been present can be incremented in some embodiments to provide a better read on user normalcy.

At step 450, the system sums the points to create a user score, which is then compared to the device score and the two metrics are assessed to compute an overall trust score (step 460), such as that referred to in step 400 on the prior figures. Depending on whether the trust score is high enough (step 470), the system will either attempt transparent authentication or conventional authentication. This route does not reflect discarding the measured conditions, but that would be done before proceeding to the conventional authentication path. If transparent authentication is to be attempted, the conditions can be used to circumvent steps 210 or 310, as the case may be.

Having now explained the detailed steps involved at various stages of an exemplary process, the following is an organized list of steps that may be taken during a normal operation of the full system. (1) The authentication application is installed on the device. (2) The application is triggered to execute. (3) The core detection process calculates trust scores. This process also generates trust scores for both the user and the system. (4) The transparent authentication application determines if the system's score is within accepted thresholds. It takes the system score generated in (3) Core Detection and compares it with the set threshold for the system. If (4) determines that the system score is not within acceptable thresholds for the system then (5) the application goes into protected mode. Protect mode restricts the ability to use the application until a defined action is taken. If the system score is sufficient, (6) the transparent authentication application checks the user trust score against set thresholds. (7) If the user's trust score is below set thresholds transparent authentication will not be performed and the user must enter their conventional authentication token, such as a password. If the password is incorrect authentication will quit.

If the password is correct then it will override the transparent authentication process and simply follow traditional authentication. The user is authenticated with the password and application data is decrypted using a key derived from the password. (8) If the user's score is within accepted thresholds contrast to (7) then the process of transparent authentication begins and is started by collecting all environmental and behavioral (user) data points that attributed to the score via trust factors. A (9) candidate hash is generated based on (8) the trust factor data points. (10) The candidate hash is checked against a list of stored hashes in the application. If (11) the candidate hash already exists and is learned then the same trust factor data points are provided to a PBKDF2 key derivation function to create a candidate encryption key, if the stored hash is not learned then the hit count is updated. (12) The encryption key derived is used to decrypt a copy of the master key stored alongside the matching stored hash. At this point the user is authenticated transparently. (13) If a matching stored hash does not exist a provisioning process is started to create one. This process (14) prompts the user for their password. (15) If the password is correct, the master key is decrypted using that password, if it is not correct authentication quits. (16) The master key is re-encrypted using the new candidate key generated from the trust factor data. (17) A copy of the master key now encrypted using the candidate key is stored with the candidate hash. (18) The new stored hash and key will able to authenticate transparently once learned. (17) The provisioning process is complete and the user is granted access and application data is decrypted ready for use.

Accordingly, it should now be clear how executing the described processes allows a participating application to lower the number of unnecessary user-involved authentication requests. These requests can be augmented with the transparent authentication process to authenticate users when they are deemed known and reside in a trusted environment or completely disable authentication if the device is compromised or untrusted. Any process descriptions or blocks in the figures, such as those of FIGS. 4, 5 and 6, should be understood as representing modules, segments, or portions of code which include one or more executable instructions for implementing specific logical functions or steps in the process, and alternate implementations are included within the scope of the embodiments of the present invention in which functions may be, in some cases, executed out of order from that shown or discussed, including substantially concurrently, depending on the functionality involved, as would be understood by those having ordinary skill in the art.

It should be emphasized that the above-described exemplary embodiments of the present invention, and particularly any "preferred" embodiments, are possible examples of implementations, merely set forth for a clear understanding of the principles of the invention. Many other variations and modifications may be made to the above-described embodiments of the invention without substantially departing from the spirit and principles of the invention. All such modifications are intended to be included herein within the scope of this disclosure and the present invention and protected by the following claims.

The invention claimed is:

1. A system for authenticating a user wishing to access secure data through a protected software application, the system comprising:
a computing device comprising a processor, a memory, an input mechanism and an output mechanism;
a plurality of sensors associated with the computing device for detecting one or more conditions;
a token repository within the memory for storing a plurality of tokens, each token representative of a unique combination of conditions;
a protected application stored within the memory and executable to provide secure data to the output mechanism upon user authentication; and
an authentication application stored within the memory and integrated with the protected application, the authentication application configured to authenticate the user to the protected application without user input when present conditions detected by the plurality of sensors match the conditions represented by a matched token from among the plurality of tokens within the token repository;
wherein the protected application uses a master key to access the secure data,
and wherein the master key was previously decrypted with data obtained from user entry of a password, and may be subsequently decrypted by the authentication application using data derived from the present conditions.

2. The system of claim 1, wherein each of the plurality of tokens are irreversibly hashed and the conditions they represent are not retained by the system.

3. The system of claim 1, wherein the authentication application uses data represented by the matched token to encrypt the master key.

4. The system of claim 3, wherein the encrypted master key is stored in the token repository and is uniquely associated with the matched token.

5. The system of claim 1, wherein the authentication application is further configured to generate a candidate token using the present conditions, and to compare the candidate token to the plurality of tokens stored in the token repository to identify the matched token, and wherein the system does not thereafter store the present conditions.

6. The system of claim 1, wherein the authentication application generates a trust score using the present conditions detected by the plurality of sensors, wherein the trust score measures the extent to which the present conditions match the conditions measured during prior user authentications.

7. The system of claim 6, wherein the authentication application irreversibly hashes each present condition into a hashed present condition and determines whether a match to the hashed present condition exists in a profile repository stored in the memory, the profile repository containing a plurality of previously hashed conditions generated by the authentication application during prior user authentications.

8. The system of claim 7, wherein the trust score is a reflection of the number of matches between hashed present conditions and previously hashed conditions; and wherein neither the present conditions nor conditions used to generate the previously hashed conditions are retained by the system.

9. The system of claim 6, wherein, if the trust score is below a predetermined threshold, the authentication application will solicit the password from the user in order to complete the authentication.

10. The system of claim 1, wherein the present conditions indicate at least a geographic location where the computing device presently is, an orientation at which the computing device is being held, and an availability of a wireless network.

11. A system for authenticating a user wishing to access secure data through a protected software application, the system comprising:
a computing device comprising a processor, a memory, an input mechanism and an output mechanism;
a plurality of sensors associated with the computer device for detecting one or more conditions;
a token repository within the memory for storing a plurality of tokens, each token representative of a unique combination of conditions;

a protected application stored within the memory and executable to provide secure data to the output mechanism upon user authentication; and an authentication application stored within the memory and integrated with the protected application, the authentication application configured to authenticate the user to the protected application without user input when present conditions detected by the plurality of sensors match the conditions represented by a matched token from among the plurality of tokens within the token repository;

wherein the authentication application is further configured to:
  generate a candidate token using the present conditions; to thereafter discard the present conditions;
  to compare the candidate token to the plurality of tokens stored in the token repository to identify the matched token; and
  to decrypt a master key from an encrypted key stored in the token repository that is uniquely associated with the matched token.

12. The system of claim 11, wherein, when the present conditions detected by the plurality of sensors do not match the conditions represented by any of the plurality of tokens within the token repository, the authentication application prompts the user for a password and decrypts the master key using the password entered by the user into the input mechanism.

13. A system for providing access to secure data comprising:
  a computerized user device equipped with a memory, a processor, an input mechanism, an output mechanism, and one or more sensors to gather user environmental data;
  a first application housed within the memory, the first application configured to send a user authentication request prior to allowing an unauthenticated user access to secure data;
  a second application housed within the memory and integrated with the first application to receive the user authentication request and to respond to the request by decrypting a master key for use by the first application to access the secure data; and,
  a token repository housed within the memory for storing a plurality of tokens generated by the second application, each token representative of a particular set of environmental conditions collected at a previous time by the one or more sensors;
  wherein, upon receiving the user authentication request, the second application is configured to decrypt the master key by either of:
  using a user supplied password; or
  generating a candidate token using present conditions measured by the one or more sensors and, if the candidate token matches one of the plurality of tokens present in the token repository, decrypting the master key from an encrypted key stored in the token repository and uniquely associated with the matched token.

14. The system of claim 13, wherein the candidate token and all of the tokens in the token repository are irreversibly hashed representations of environmental conditions, and wherein the environmental conditions represented by the tokens are not retained by the system.

15. The system of claim 14, wherein the second application previously generated the encrypted key from the master key using environmental conditions associated with the matched token.

16. The system of claim 13, wherein the second application will only generate the candidate token when a user score indicative of the regularity of present environmental conditions is at or above a pre-designated level.

17. The system of claim 16, wherein the second application will generate the master key using the user supplied password when the user score is below the pre-designated level.

18. A method of transparent user authentication comprising the steps of:
  receiving a request for a master key to access secure data;
  gathering present conditions from a plurality of device sensors;
  using a processor and an encoding algorithm, cyrptographically hashing each present condition and comparing the resulting present condition hashes to pre-recorded hashes representing past conditions, the pre-recorded hashes stored in a profile repository in a memory of a user computerized device, in order to generate a trust score;
  if the trust score exceeds a predetermined threshold, generating a candidate token by cryptographically hashing a data string formed by the present conditions and comparing it to pre-recorded tokens stored in a token repository of the memory;
  if the candidate token matches one of the pre-recorded tokens, using a derived key derived from the present conditions to generate the master key from an encrypted key uniquely associated with the matched token; and
  providing the master key to access the secure data;
  wherein all of the above steps except for the gathering of present conditions are performed without transmitting data external to the user computerized device.

19. The method of claim 18, wherein, if the trust score falls below the predetermined threshold, soliciting a password for use in decrypting the master key.

20. The method of claim 18, wherein the step of generating the master key is performed by decrypting the encrypted key using the derived key.

21. The method of claim 18, wherein the derived key is a cryptographically hashed representation of a concatenated data string of the present conditions.

22. The method of claim 18, wherein, if the candidate token does not match any of the pre-recorded tokens, the method further comprises the steps of soliciting a password for use in decrypting the master key.

23. The method of claim 22, wherein, if the password successfully decrypts the master key, the method further comprises the steps of:
  deriving the derived key from the present conditions;
  encrypting the master key with the derived key; and
  storing the candidate token in the token repository in a manner such that it is uniquely associated with the encrypted master key.

* * * * *